(12) United States Patent
Al-Hashmy et al.

(10) Patent No.: US 11,548,205 B2
(45) Date of Patent: Jan. 10, 2023

(54) POST CURING PROCESS FOR COMPOSITE PARTS PRODUCED BY FILAMENT WINDING MANUFACTURING PROCESS

(71) Applicant: Saudi Arabian Oil Company, Dhahran (SA)

(72) Inventors: Hasan Ali Al-Hashmy, Dhahran (SA); Kaamil Ur Rahman Mohamed Shibly, Al-Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 307 days.

(21) Appl. No.: 16/931,665

(22) Filed: Jul. 17, 2020

(65) Prior Publication Data
US 2022/0016824 A1    Jan. 20, 2022

(51) Int. Cl.
| B29C 53/84 | (2006.01) |
|---|---|
| B29C 53/58 | (2006.01) |
| B29C 65/56 | (2006.01) |
| B29C 65/00 | (2006.01) |
| B29C 53/82 | (2006.01) |
| B29K 63/00 | (2006.01) |
| B32B 38/00 | (2006.01) |

(52) U.S. Cl.
CPC ............ *B29C 53/845* (2013.01); *B29C 53/58* (2013.01); *B29C 53/821* (2013.01); *B29C 65/562* (2013.01); *B29C 66/721* (2013.01); *B29K 2063/00* (2013.01); *B32B 38/0036* (2013.01)

(58) Field of Classification Search
CPC . B32B 38/0036; B29C 53/845; B29C 53/821; B29C 53/58
See application file for complete search history.

(56) References Cited

U.S. PATENT DOCUMENTS

| 1,944,461 | A | | 1/1934 | Pike |
|---|---|---|---|---|
| 2,472,246 | A | | 6/1949 | Christian et al. |
| 2,862,541 | A | * | 12/1958 | Brink ............. B29C 70/16 |
| | | | | 264/258 |
| 3,036,341 | A | | 5/1962 | Taylor |
| 3,379,591 | A | | 4/1968 | Bradley |
| 3,594,247 | A | | 7/1971 | Pennington et al. |
| 4,529,139 | A | | 7/1985 | Smith et al. |

(Continued)

FOREIGN PATENT DOCUMENTS

| CN | 207922560 U | * | 9/2018 |
|---|---|---|---|
| WO | 2015024363 A1 | | 2/2015 |
| WO | 2017100991 A1 | | 6/2017 |

OTHER PUBLICATIONS

Minsch, N., et al. "Analysis of filament winding processes and potential equipment technologies" Procedia CIRP 66 (2017): 125-130.

(Continued)

*Primary Examiner* — Carson Gross
(74) *Attorney, Agent, or Firm* — Leason Ellis LLP

(57) ABSTRACT

A process for post curing a composite product made from a filament winding process comprises the steps of: surrounding the composite product, that is disposed about a rotatable mandrel, with an outer jacket; and simultaneously rotating and heating the mandrel resulting in post curing of the composite product according to a process that can be referred to as being a combo-semi-centrifugal post curing process.

9 Claims, 6 Drawing Sheets

(56) References Cited

U.S. PATENT DOCUMENTS

| | | | |
|---|---|---|---|
| 4,749,534 A | | 6/1988 | Robertson |
| 4,822,444 A | | 4/1989 | Weingart et al. |
| 4,838,971 A | | 6/1989 | Cacak |
| 4,849,150 A | * | 7/1989 | Kittaka ................ B29D 23/001 264/258 |
| 4,997,503 A | | 3/1991 | Bohannan et al. |
| 5,338,497 A | | 8/1994 | Murray et al. |
| 5,360,275 A | * | 11/1994 | Harris .................. B29D 23/001 384/420 |
| 6,179,945 B1 | | 1/2001 | Greenwood et al. |
| 7,815,141 B2 | | 10/2010 | Uozumi et al. |
| 7,905,442 B2 | | 3/2011 | Uozumi et al. |
| 9,757,905 B2 | | 9/2017 | Harasin et al. |
| 2011/0308709 A1 | * | 12/2011 | Ouellette .............. B29C 53/821 156/499 |
| 2014/0308433 A1 | | 10/2014 | Ouellette |

OTHER PUBLICATIONS

Koustas, Isabella, et al. "On the development of a filament winding robotic system." Procedia Manufacturing 17 (2018): 919-926.

Colombo, Chiara, and Laura Vergani. "Optimization of filament winding parameters for the design of a composite pipe." Composites Part B: Engineering 148 (2018): 207-216.

Zygmuntowicz, Justyna, et al. "Investigation on fabrication and property of graded composites obtained via centrifugal Tasting in the magnetic field." Composites Part B: Engineering 173 (2019): 106999.

* cited by examiner

POST CURING PROCESS FOR COMPOSITE PARTS PRODUCED BY FILAMENT WINDING MANUFACTURING PROCESS

TECHNICAL FIELD

The present invention relates to a filament winding process and more particularly, to a post curing process for composite parts produced by filament winding process by utilizing a semi-centrifugal casting process, which can be a referred to as being a combo-semi-centrifugal post curing process.

BACKGROUND

Filament winding is a manufacturing technique primarily used to produce composite parts with open cylinders, such as pipes, or closed end structure such as pressure vessels or tanks. In this manufacturing process, the continuous reinforcements (fibers) are dipped into a matrix material (such as epoxy resin) and are wound onto a mandrel until the surface is covered, and the required thickness is achieved. This process is fully automated where the preprogrammed mandrel rotates, and horizontal movement of reinforcement occurs in tension to produce a helical pattern.

There are two main types of winding machines: helical winding machines and polar winding machines. The helical winding is similar to a lathe machine in which the mandrel rotates continuously at a constant speed, and the delivery eye moves back and forth. The delivery eye can be adjusted to produce the desired winding angle. The reinforcement is delivered from a creel and passed through a bath of resin to pick up the resin before it is placed into the mandrel. This technique allows the production of lamina with a balanced two-ply laminate at a ±θ angle. A helical winder can be found with six axes machine that allows controlling its spindle rotation, horizontal carriage feed, radial carriage position, delivery eye angle and yaw, and vertical carriage feed. Once the winding process is completed, the curing of the composite part takes place whether in-situ by pumping steam into a mandrel or placing the composite part into a gas fire oven.

A polar winder is used to produce spherical vessels or cylindrical vessels with a length/diameter ratio less than 2. This technique is less complex than helical winder and less costly as it consists of an arm that performs rotational movement around the mandrel delivering the reinforcement into a planar path. The desired orientation angle of plays is achieved easily with the rotational movement of the arm; once the winding process is completed, the composite part is placed into gas-fired or electrical oven for curing.

As is well known in the technical field, the presence of manufacturing defects can negatively affect the structural integrity of the composite product over its lifetime. Voids, fiber crossover and undulation can all occur during the manufacturing process and result in composite products with lower strength which are more susceptible to failure when subjected to hoop stress, buckling and bending loads. It is therefore an obvious goal to reduce the presence of any manufacturing defects.

Another well-known technique that is used to produce composite parts is centrifugal casting. Centrifugal casting is widely used in the industry on producing metal matrix composites specifically in the production process of metal pipes. Recently, semi-centrifugal casting has been deployed in producing of polymer matrix composites parts such as pipe and tank. In centrifugal casting, the chopped fibers and resin are sprayed inside a rotated drum. The centrifugal force generated inside the drum causing the distribution of the reinforcement as well as shaping the cylindrical part shape.

Once the filament winding process is completed, a post curing process is used to fully cure the manufactured composite part. Traditionally, several pipe sections are placed in an oven and heated to the required temperature for the required duration (varies depending on the type of polymer) until the pipe section is completely cured. After curing, the product is cooled and is ready.

For example, RTR pipes produced using the traditional filament winding process contain a large number of voids in their matrix. These voids lead to poorer long term mechanical properties (e.g. poorer fatigue, creep, etc. resistance), act as initiation sites for cracks and attenuate acoustic signals—making inspection by traditional methods such as UT, unfeasible.

One (but not exclusive) cause for void formation is the release of air/gases from the epoxy resin during curing. The air is trapped in the resin during the winding process and is not released prior to curing. This trapped air can be released by the application of centrifugal force during the post winding curing process. Also, the formation of residual stress due to fiber crossover and undulation during fiber placement in the filament winding process.

Another problem that is present during the filament winding process is the uneven curing of the resin.

SUMMARY

The present disclosure is directed to ameliorating at least some of manufacturing defects by improving the current manufacturing process (e.g., helical and polar processes). In accordance with the present disclosure, a process and system are provided to completely cure a formed composite part/product, such as a pipe section, while the pipe section is on the mandrel. More specifically, once the filament winding process is completed and the formed product is disposed about the mandrel, the mandrel and formed product (e.g., pipe section) are surrounded by an outer jacket that is disposed thereabout. The mandrel is then spun at specific speeds while simultaneously being heated. The jacket is configured to have a very close tolerance so that only a very small gap, such as less than several millimeters, is present between the composite pipe (that is wound about the mandrel) and jacket.

In one aspect of the present disclosure, a process for post curing a composite product made from a filament winding process comprises the steps of: surrounding the composite product, that is disposed about a rotatable mandrel, with an outer jacket; and simultaneously rotating and heating the mandrel resulting in post curing of the composite product.

BRIEF DESCRIPTION OF THE DRAWING FIGURES

DETAILED DESCRIPTION OF CERTAIN EMBODIMENTS

FIGS. 1-5 illustrate a post cure filament winding system 100 in accordance with one embodiment of the present disclosure for curing a formed composite part (e.g., a formed composite in the form of a pipe section) after the filament winding process is completed.

Figure 1:
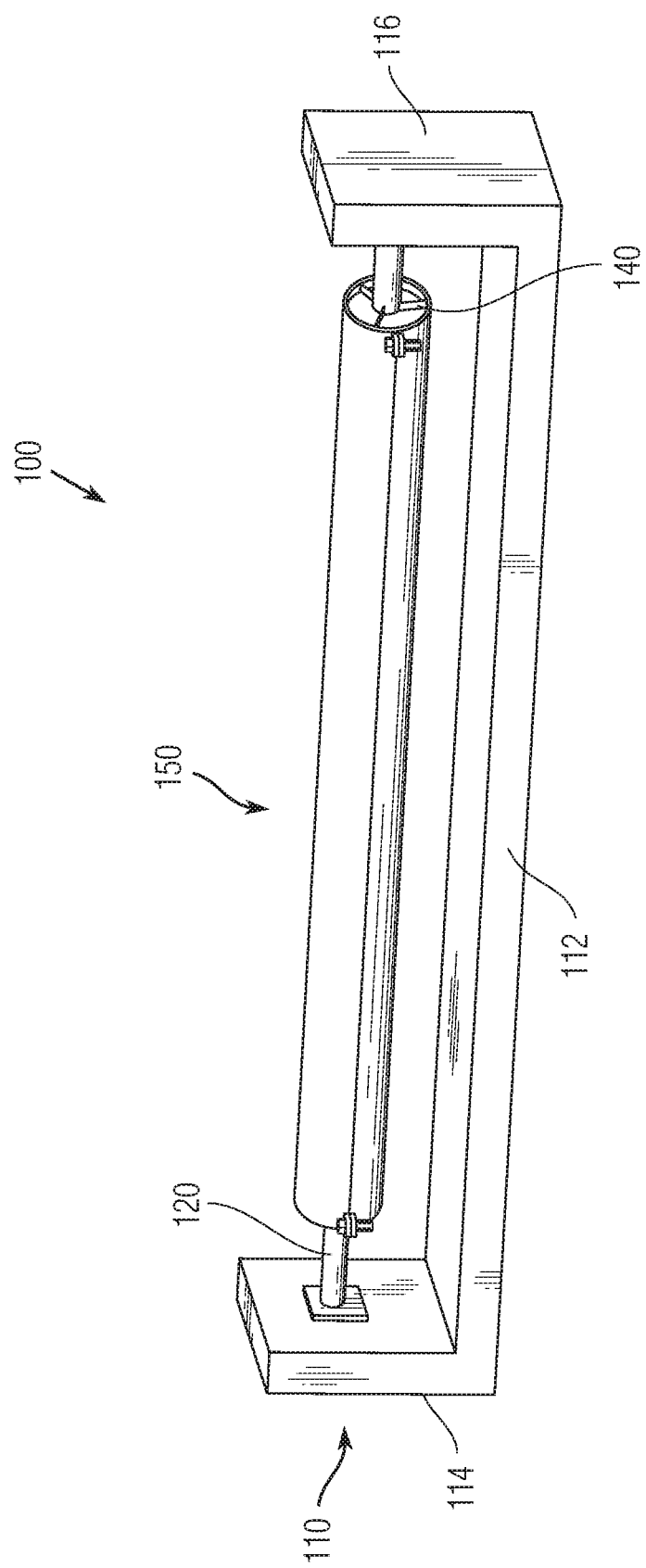
FIG. 1 is a side perspective view of a post curing rig for post curing of composite parts produced by a filament winding manufacturing process.

The system 100 of FIG. 1 includes a filament winding rig 110 that represents a base or support (frame) component of the system 100. The rig 110 can take any number of different shapes and sizes and is configured to be disposed on and/or mounted to a support surface, such as a table or the like. The illustrated rig 110 has an elongated base 112 that has a first upstanding end wall 114 at a first end and a second upstanding end wall 116 at an opposite second end. The end walls 114, 116 can be oriented perpendicular to the base 112. An open space is located between the end walls 114, 116 above the base 112.

The base 112 holds and supports an axle 120 in a rotatable manner within this space between the end walls 114, 116. The axle 120 has a first end that is coupled to the first end wall 114 and a second end that is coupled to the second end wall 116. It will be appreciated that the axle 120 is operatively coupled to a motor or the like for rotating the axle 120 at a desired speed. Operation of the motor is translated into rotation of the axle 120 at a controlled speed (RPM).

The system 100 includes a mandrel 130 that is coupled to the axle 120 and more specifically, the mandrel 130 is coupled to the axle 120 such that the axle 120 and the mandrel 130 rotate together in unison. As is known, a mandrel is generally a shaft or spindle to which work (e.g., in this case the composite pipe section) is fixed while being turned. The illustrated mandrel 130 can thus be a hollow cylindrical shaped tube.

Figure 2:
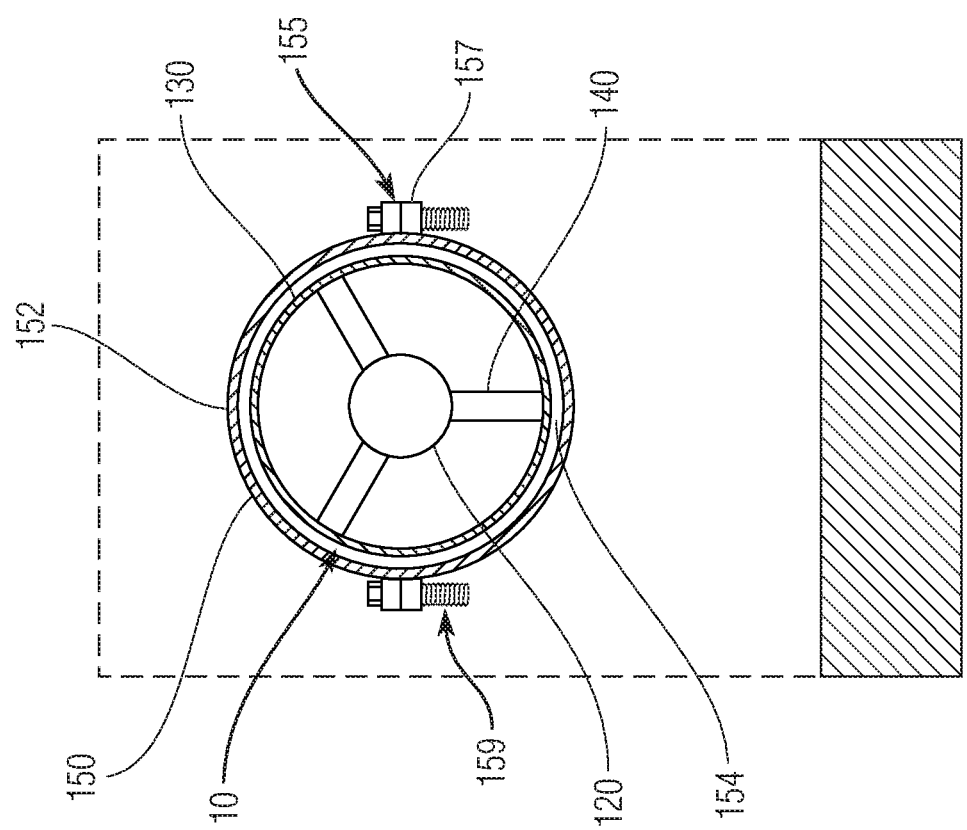
FIG. 2 is a vertical cross-sectional view thereof.
Figure 3:
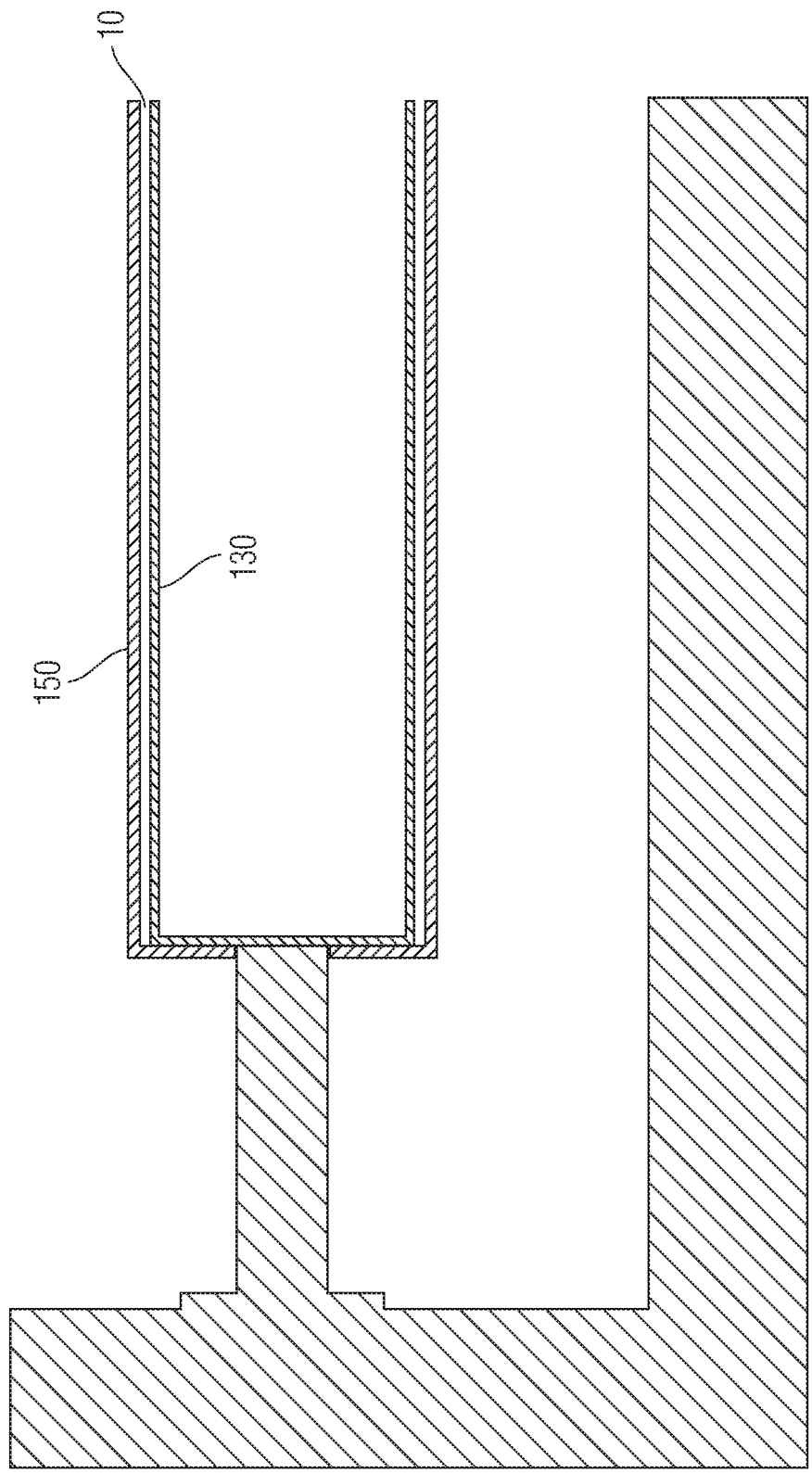
FIG. 3 is a longitudinal cross-section view of one end portion thereof.

Any number of techniques can be used to couple the mandrel 130 to the axle 120 such that the mandrel 130 surrounds the axle 120. For example, a plurality of connectors or couplers 140 can be used to attach the mandrel 130 to the axle 120. As shown in FIGS. 1-2, there can be one coupler 140 at the first end of the mandrel 130 and another coupler 140 at the opposite second end of the mandrel 130. The couplers 140 can be considered to be inserts that are disposed within the hollow interior space of the mandrel 130. The coupler 140 can have a spoked construction defined by a plurality of spokes that extend between the axle 120 and the mandrel 130. While the couplers 140 are located at the ends of the mandrel 130, one or more other couplers 140 can be located at an intermediate location between the ends of the mandrel 130.

As described herein, the mandrel 130 is used as part of the filament winding process and in particular, the composite material is wound about the mandrel 130 to form a pipe section (formed product) 10.

In accordance with the present disclosure, the system 100 further includes an outer jacket 150 that surrounds the mandrel 130 (and likewise surrounds the composite material). There is a very tight tolerance between the outer surface of the mandrel 130 and the inner surface of the outer jacket 150. As described below, it is within this annular shaped space that the wound composite material (pipe section) 10 is located since it is wound about the mandrel 130. As also described herein, the outer jacket 150 is employed and positioned relative to the mandrel 130 once the filament winding process is completed and the composite material is wound about the mandrel 130.

The illustrated outer jacket 150 has a clamshell construction in that the outer jacket 150 has a first part or first half 152 and a second part or second half 154. The first and second parts 152, 154 can be hingedly coupled to one another or can be coupled to one another using other techniques, including using fasteners, such as clamps. In one embodiment, the first and second parts 152, 154 are separate parts that are joined to one another using a clamping action as discussed herein.

The first and second parts 152, 154 are intended for placement over the formed composite product 10 (e.g., a pipe section). Once the first and second parts 152, 154 are placed around the formed pipe section 10, the seams of the outer jacket 150 are sealed using a gasket 155 that is located along one or more exposed edges of the first part 152 and/or the second part 154. The two parts 152, 154 can thus be coupled to one another as by being bolted to one another using two flanges 157 and seat against one another in the closed position of the outer jacket 150 and permit passage of a fastener 159 (bolt) that is used to attach the two flanges 157 to one another and thereby, attach the two parts 152, 154 resulting in the outer jacket assuming a hollow cylindrical shape. The outer jacket 150 is thus constructed such that it envelops the formed pipe 10, the mandrel 130 and part of the axle 120. The gasket 155 can be made of a high strength, thermally resistant polymer, such as Viton, or some other suitable material.

The outer jacket 150 can be formed of any number of suitable materials including but not limited to metals, such as carbon steel and its different composition, metallic alloys, high conductivity and light weight metal alloys such as aluminum, etc. The outer jacket 150 is designed to rotate with the mandrel 130 during the semi-centrifugal post curing process described herein. In addition, the outer jacket 150 can be formed of two or more parts that are coupled to one another to form the complete outer jacket 150. For example, the outer jacket 150 can be formed of two parts that are locked together by bolts and nuts. Any number of techniques can be used to couple the outer jacket 150 to the mandrel 130 such as use of fasteners or the like at the ends of both the outer jacket 150 and the mandrel 130. The inner surface of the outer jacket is preferably smooth; however, depending upon the precise application, the inner surface can have a non-smooth appearance. Preferably, the inner surface of the jacket is smooth and is coated with a releasing agent to prevent any undesired attachment of the resin to the inner surface.

Post Curing Process

As mentioned, the current process for post curing is performed after the filament winding process is completed as by placement of the formed product (pipe sections) 10 into an oven. The outer jacket 150 is thus placed about (surrounding) the formed product 10 that is on the mandrel 130. The mandrel 130 is then spun at specific (pre-selected) speeds while simultaneously being heated using techniques described herein. This causes the composite product that is formed on the mandrel 130 to cure completely, while reducing the density of voids in the final product (pipe section) 10. This in turn increases the mechanical integrity of the finished pipe section 10. In one embodiment, the mandrel 130 is spun at speeds of less than several thousand rpm, e.g., less than 3000 rpm.

The outer jacket 150 is thus provided to restrict any movement of the formed composite product 10 during the rotation of the mandrel 130. The outer jacket 150 thus controls the dimensions (specs) for the formed product 10 so that they are within allowed tolerances. The outer jacket 150 thus prevents any unwanted movement or expansion of the composite material in the outward direction away from the mandrel.

One of the features of the present disclosure is the heating of the mandrel 130 as part of the post cure process.

The heating of the mandrel 130 can be formed in at least several different ways including: filament heating and eddy current heating.

Filament Heating

In filament heating, a thin coil (e.g., 5 mm to 50 mm diameter) of a high resistance metal (e.g., copper alloys or any high conductive metallic alloys) is placed inside and outside the mandrel 130.

It will be appreciated that the size of the coil varies depending on the size of the composite parts whether pipes or pressure vessel or tanks.

The high resistance causes the electrical energy to be converted to thermal energy which causes a heating of the mandrel 130 which results in heating of the formed product 10 (pipe section) that is disposed on the mandrel 130. As discussed herein, the heat transfer is sufficient to cure the polymer of the composite.

Eddy Current Heating

In this embodiment, the coil that is associated with the mandrel 130 is subjected to a changing magnetic field. This coil can be in the form of the thin coil mentioned above or it can be a different coil. It will also be appreciated that the source of alternating electric field can be an electrical main power supply from the grid or other suitable source. This induces eddy currents in the mandrel by a well-known phenomenon called Faraday's Law of Induction. These currents cause electrical energy to dissipate, causing the mandrel to heat up. The heated mandrel 130 results in the heating and curing of the pipe section 10 that is formed on an outer surface of the mandrel 130. The temperature and duration of heating depends on the type of polymer being used to form the composite product (pipe section 10).

For both heating techniques (filament and eddy current), typical heating temperatures can be between 80-120° C. for suitable polymers, such as an epoxy and its family of epoxide group, and thermosetting polymers with their suitable hardeners. The precise curing time will vary depending upon the formulation of the composite; however, exemplary curing times can be, in at least one example, between 6 hours and 3 days depending on the size of composite parts and the product quality that is desired to be achieved.

Figure 4:
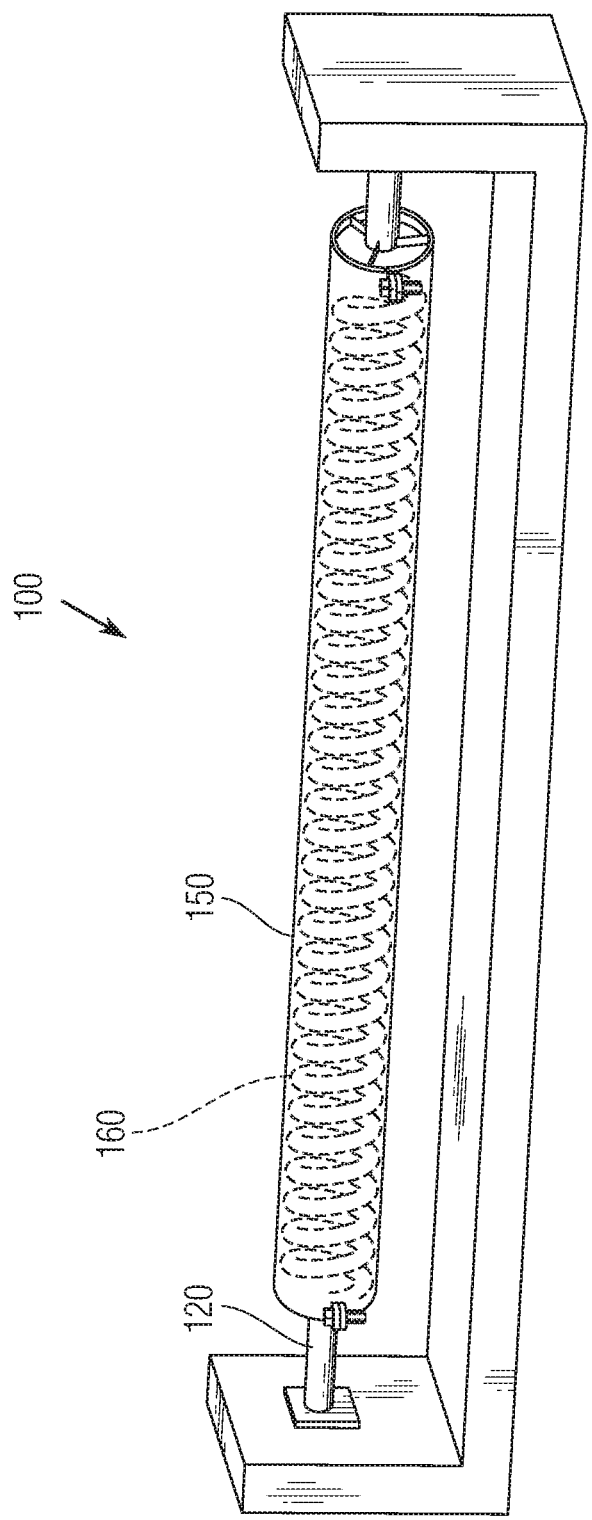
FIG. 4 is a side perspective view of the post curing rig illustrating an internal heating coil disposed inside the mandrel, wherein a size of the internal heating coil is exaggerated for purpose of illustration.
Figure 5:
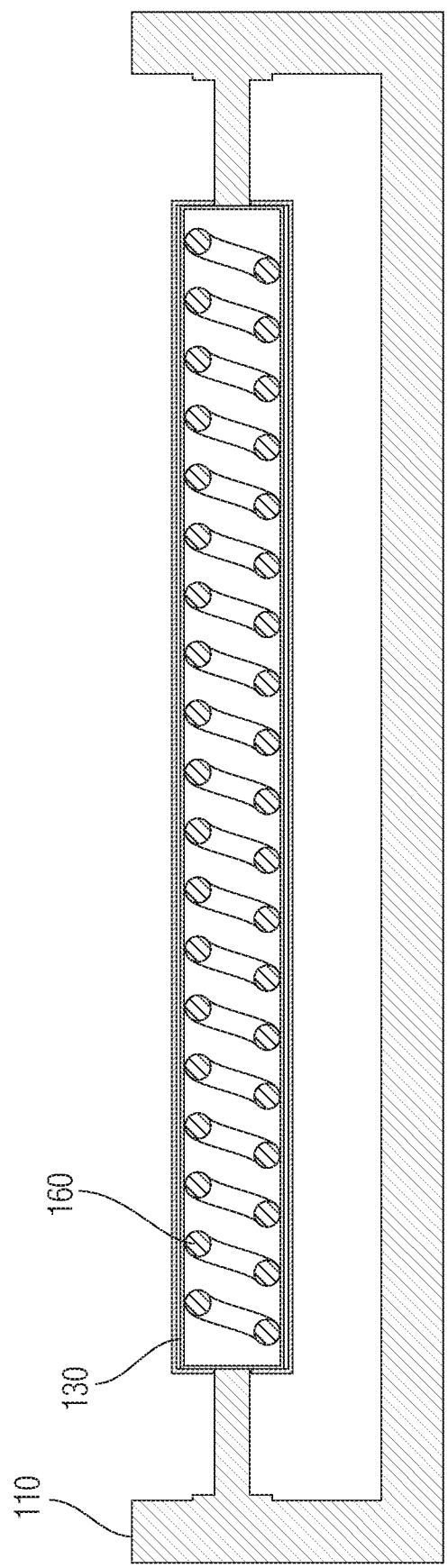
FIG. 5 is a longitudinal cross-section of the post curing rig with a size of the internal heating coil being exaggerated for purpose of illustration.

FIGS. 4-5 illustrate the use of an internal coil 160 for heating of the mandrel 130. It will be appreciated that in FIGS. 4-5, the coil diameter of coil 160 is greatly exaggerated for clarity and to show the positioning and orientation of the internal coil 160. The internal coil 160 extends along a substantial length of the mandrel 130 and preferably, close to the entire length of the mandrel 130. This ensure that the entire length of the formed product 10 is subject to even, uniform heat resulting in optimal curing. It will be understood that additional internal elements can be present to hold the internal coil 160 in place, such as clips or other structures.

Figure 6:
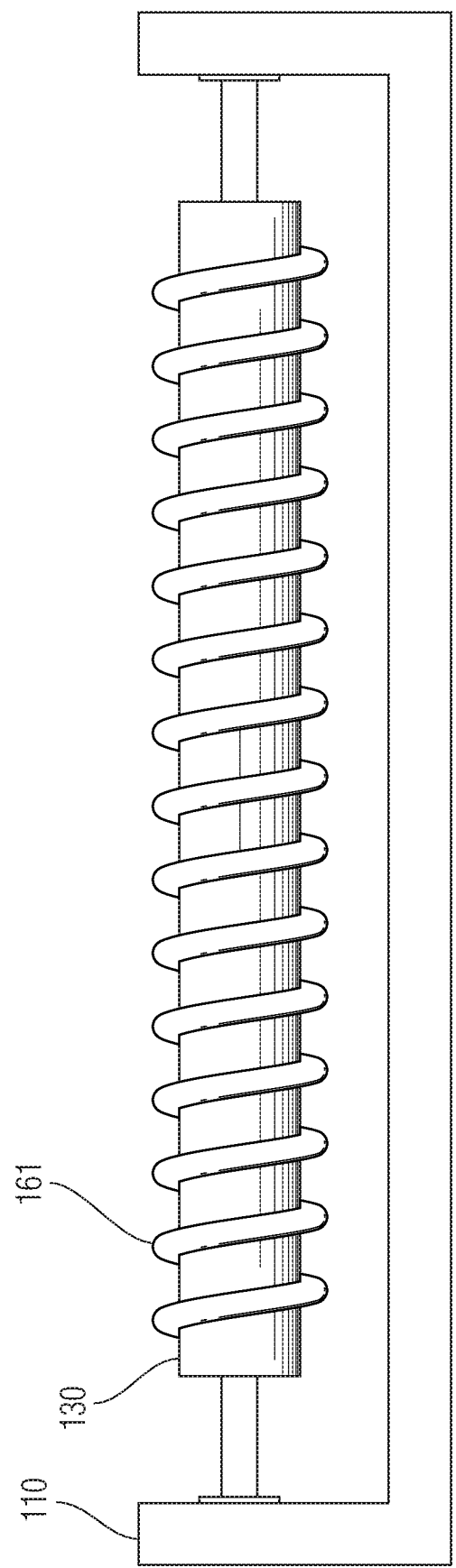
FIG. 6 is a side elevation view of a post curing rig with an external heating coil.

While FIGS. 4-5 illustrate the internal coil 160, it will be understood that the mandrel 130 can further include an external coil (not shown) that is disposed about the outer surface of the mandrel 130. For example, as shown in FIG. 6, an external coil 161 can be wrapped around the outer surface or be formed in close proximity to the outer surface of the mandrel 130 and extend preferably from one end to the other end of the mandrel 130. When the coil 161 is disposed about (or slightly below) the exterior of the mandrel 130, the coil 161 is formed such that it does not adversely impact with the filament winding process. It will be appreciated that the area of the outer surface of the mandrel 130 becomes the inner surface of the formed composite part 10 since the composite material is wound and layered over the outer surface of the mandrel 130.

It will be appreciated that in FIG. 6, the coil diameter of coil 161 is greatly exaggerated for clarity and to show the positioning and orientation of the coil 161.

As mentioned, heating can be done in two ways, namely, joule heating and induction heating. In joule heating, the coil 160 is made of a high resistance metal. Such coils 160 are usually made of a small diameter, such as 1 to 20 mm depending on the size of the composite parts wither pipes or pressure vessel, or tanks to achieve desired curing temperature in order to increase the resistance. An electric current is applied to the coil 160 and the high resistance causes the electrical energy to be converted to heat. In induction heating, the coil 160 is made of a low resistance metal. An alternating electric current is applied to the coil 160, which results in an alternating magnetic field. This changing magnetic field induces eddy currents in the mandrel according to Faraday's law of induction. These eddy currents dissipate their energy as heat, causing a rise in the temperature of the mandrel 130 itself, which in turn cures the composite material (formed product, such as the pipe section 10).

It will be appreciated that any number of different sources of electricity can be used. For example, a standalone console or other device, like a generator, or solar photovoltaic (PV) can be used as the source of electricity that provides the electrical current (of desired type) to the heating element.

As mentioned previously, one problem that is present during the filament winding process is the uneven curing of the resin. This can be ameliorated by the use of heating during the post curing process. Traditionally, this is done via oven (e.g. electrical oven, fire oven, etc.); however, there are many technical challenges with traditional post curing when combined with the processes described herein to form the product 10 and the specific rotation speed during post curing.

The system 100 overcomes these deficiencies and provides a solution to this problem. More specifically, the formed product 10 (e.g., pipe section 10) can be evenly heated using the coil 160 in either of the two methods described herein.

The present application discloses a post-processing method for pipes manufactured using a traditional filament winding process. The present system and method includes the step of spinning the partially cured pipe at specific velocity, while heating it to complete the curing process. This introduces two major technical challenges. The first is that specific speed rotation will result in the deformation of the pipe due to centrifugal forces. In the worst case, this can even result in ejection of material and damage to the pipe. The second is that it is difficult to perform steam heating, now that the pipe section has been sealed and is being rotated at specific speed. The solution to the former is the use of an external jacket with very tight tolerances, the solution to the latter is to replace heating by steam injection with heating using a coil as disclosed herein. This improved post processing method results in composite pipes with lower void densities and hence superior mechanical properties due to the reduction of residual stress presence during manufacturing process.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A process for post curing a composite product made from a filament winding process comprising the steps of:
    winding a composite material about a rotatable mandrel until a desired thickness is obtained and the composite product is formed, wherein the composite material comprises fibers impregnated with a resin;
    surrounding the composite product, that is disposed about the rotatable mandrel, with an outer jacket that is distinct and separable from the composite product; and
    simultaneously rotating and heating the mandrel within the outer jacket resulting in post curing of the composite product.

2. The process of claim 1, wherein the step of heating the mandrel comprises heating the mandrel to a temperature between 80-120° C.

3. The process of claim 1, wherein the step of heating the mandrel comprises using a heating element that comprises a conductive coil that is disposed within a hollow interior of the mandrel.

4. The process of claim 3, wherein electrical current is applied to the conductive coil.

5. The process of claim 3, wherein an alternating electrical current is applied to the conductive coil to form an alternating magnetic field that induces eddy currents in the mandrel.

6. The process of claim 1, wherein the outer jacket includes a first part and a second part that when mated to one another surround the mandrel defining a space in which the composite product is located.

7. The process of claim 6, wherein the first part comprises a first hemispherical shaped part and the second part comprises a second hemispherical shaped part, wherein the first hemispherical shaped part has a first flange and the second hemispherical shaped part has a second flange that seats against the first flange and a fastener passes through the first flange and the second flange for securely attaching the first hemispherical shaped part to the second hemispherical shaped part.

8. The process of claim 7, further including the step of placing a gasket along exposed longitudinal edges of each for the first hemispherical shaped part and the second hemispherical shaped part for sealing the first and second hemispherical shaped parts.

9. The process of claim 1, further including a step of coating an inner surface of the outer jacket with a releasing agent to prevent undesired attachment between the composite product and the outer jacket.

* * * * *